(12) United States Patent
Yanagisawa

(10) Patent No.: US 10,764,030 B2
(45) Date of Patent: *Sep. 1, 2020

(54) REDUCTION IN STORAGE USAGE IN DISTRIBUTED DATABASES

(71) Applicant: INTERNATIONAL BUSINESS MACHINES CORPORATION, Armonk, NY (US)

(72) Inventor: Hiroki Yanagisawa, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/802,052

(22) Filed: Nov. 2, 2017

(65) Prior Publication Data

US 2018/0323965 A1 Nov. 8, 2018

Related U.S. Application Data

(63) Continuation of application No. 15/585,820, filed on May 3, 2017.

(51) Int. Cl.
| | |
|---|---|
| *H04L 9/06* | (2006.01) |
| *G06F 21/60* | (2013.01) |
| *H04L 9/32* | (2006.01) |
| *H04L 9/08* | (2006.01) |
| *G06F 21/64* | (2013.01) |

(52) U.S. Cl.
CPC .......... *H04L 9/0637* (2013.01); *G06F 21/602* (2013.01); *G06F 21/64* (2013.01); *H04L 9/0643* (2013.01); *H04L 9/0891* (2013.01); *H04L 9/3236* (2013.01); *H04L 9/3297* (2013.01); *H04L 2209/38* (2013.01)

(58) Field of Classification Search
CPC ....... H04L 9/0637; H04L 9/0643; H04L 9/00; H04L 9/0618; H04L 9/06; G06F 21/602; G06F 21/60
USPC ........................................................ 713/189
See application file for complete search history.

(56) References Cited

U.S. PATENT DOCUMENTS

| | | | | |
|---|---|---|---|---|
| 2015/0039629 | A1* | 2/2015 | Theeten | G06F 17/30628 707/747 |
| 2016/0170657 | A1* | 6/2016 | Suehr | G06F 3/0649 711/162 |
| 2017/0353311 | A1* | 12/2017 | Schukai | H04L 9/0618 |
| 2018/0248845 | A1* | 8/2018 | Irwan | H04L 63/0218 |

OTHER PUBLICATIONS

List of IBM Patents or Patent Applications Treated as Related dated Nov. 2, 2017, 2 pages.

\* cited by examiner

*Primary Examiner* — Kevin Bechtel
*Assistant Examiner* — Quazi Farooqui
(74) *Attorney, Agent, or Firm* — Tutunjian & Bitetto, P.C.; Vazken Alexanian

(57) ABSTRACT

Common data are maintained by a system including a plurality of node devices that each store a respective portion of a common data in a respective database, wherein a node device of the plurality of node devices stores a first portion of the common data, and receives a hash value of a second portion of the common data that is different from the first portion, in response to an update of the second portion of the common data.

20 Claims, 11 Drawing Sheets

REDUCTION IN STORAGE USAGE IN DISTRIBUTED DATABASES

BACKGROUND

Technical Field

The present invention relates to reduction in storage usage in blockchain.

Description of the Related Art

In some blockchain implementations, nodes of blockchain fabric each have an identical copy of a common data (sometimes referred to as "world state" or "ledger", etc.). For example, when there are N nodes in the blockchain fabric, N nodes have N copies of the common data. A main drawback of this implementation is the huge amount of storage required for usage in each node.

SUMMARY

According to an embodiment of the present invention, a system includes a plurality of node devices that each store at least a respective portion of a common data in a respective database, wherein at least one node device of the plurality of node devices is configured to store a first portion of the common data, and receive a hash value of a second portion of the common data that is different from the first portion, in response to an update of the second portion of the common data.

In an embodiment, the system may also include a node device, a method performed by the foregoing system, and a computer readable medium storing instructions for causing a processor or programmable circuitry to perform the method of the foregoing system. The summary clause does not necessarily describe all features of the embodiments of the present invention. Embodiments of the present invention may also include sub-combinations of the features described above.

BRIEF DESCRIPTION OF THE DRAWINGS

The following description will provide details of preferred embodiments with reference to the following figures wherein.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
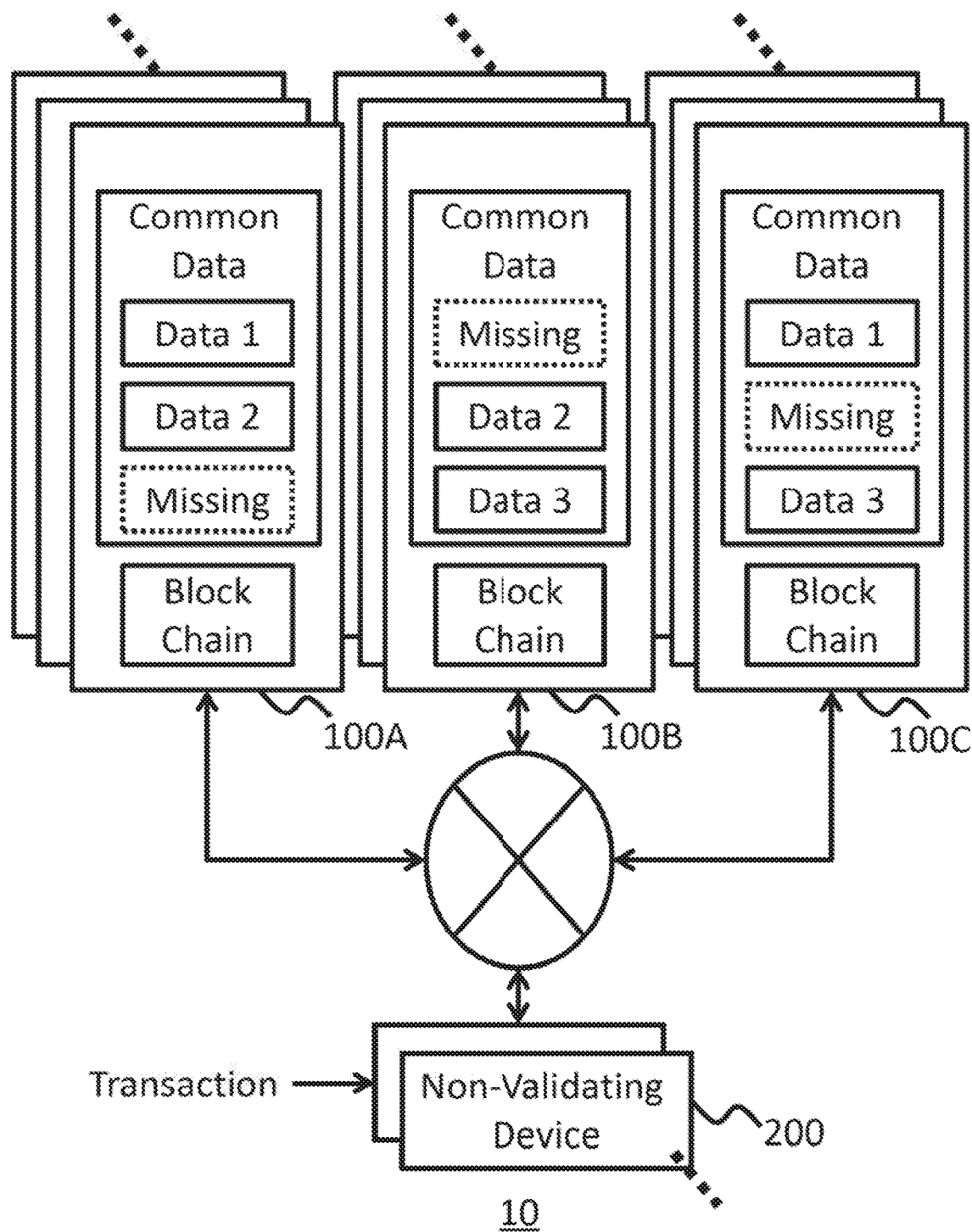
FIG. 1 shows an exemplary configuration of a system, according to an embodiment of the present invention.

FIG. 1 shows an exemplary configuration of a system 10, according to an embodiment of the present invention. The system 10 as a whole may perform a distributed database, such as Blockchain, where a plurality of node devices may maintain a common data, process a transaction, and grow a blockchain.

Although the system 10 is described below in the course of performing Hyperledger, among a number of Blockchain technologies, the system 10 may also perform other Blockchain technologies. A number of implementations adopted for Hyperledger and other Blockchain technologies may be used for the embodiments explained below.

The system 10 may comprise a plurality of node devices (such as one or more node devices 100A, one or more node devices 100B, and one or more node devices 100C), and one or more non-validating devices 200. In an embodiment, each of the plurality of node devices 100A, 100B, 100C and the non-validating device 200 may comprise a computer, a programmable circuit, etc. The plurality of node devices 100A, 100B, 100C and the non-validating device 200 may communicate with each other via a network such as the internet.

The node devices 100A, 100B, and 100C may each perform as validating peers in Hyperledger and store at least a portion of a common data and a block chain. The common data may comprise a plurality of portions of data (e.g., C portions: C is an integer larger than 1, such as 3 or 4). In the embodiment of FIG. 1, C is 3 and the common data are divided into 3 data segments, such as Data 1, Data 2, and Data 3.

A plurality of node devices 100A, 100B, and 100C may each store at least a respective portion of a common data in a respective database. In an embodiment, each node device may store D portions, where D is an integer larger than 0 and smaller than C (typically D may be C−1).

In the embodiment of FIG. 1, D is 2 and the node device 100A may store Data 1 and Data 2 among three portions of the common data, the node device 100B may store Data 2 and Data 3 among three portions, and the node device 100C may store Data 1 and Data 3 among three portions of the common data.

The node devices 100A, 100B, and 100C may collectively store the common data (Data 1, Data 2, and Data 3) entirely. Thereby, the system 10 may reduce storage usage by a factor D/C for the common data in each node device. The plurality of node devices may store the same block chain, such as the blockchain.

The non-validating device 200 can perform as a non-validating peer in a Hyperledger. The non-validating device 200 may receive transactions from user terminals. The non-validating device 200 can distribute the transactions to the plurality of node devices 100A, 100B, and 100C. The non-validating device 200 can receive results of the transactions from the plurality of node devices 100A, 100B, and 100C and return the results to the user terminals.

In an embodiment, the system 10 may not include the non-validating device 200. In such embodiments, the plurality of node devices 100A, 100B, and 100C may directly receive the transactions from the user terminals, or one of the plurality of node devices 100A, 100B, and 100C may perform as the non-validating device.

Figure 2:
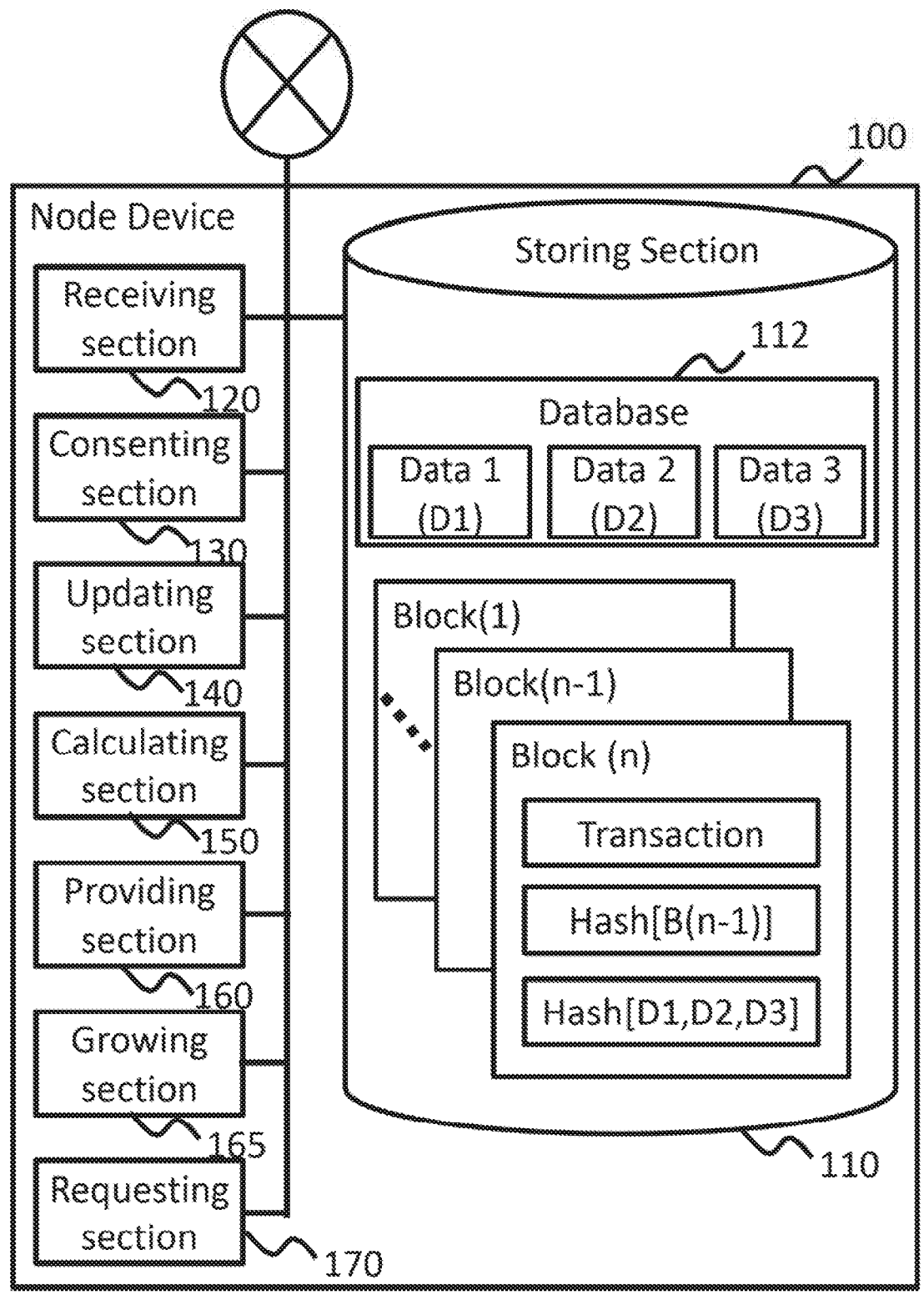
FIG. 2 shows an exemplary configuration of a node device of the system, according to an embodiment of the present invention.

FIG. 2 shows an exemplary configuration of a node device 100 of the system 10, according to an embodiment of the present invention. At least one node device in the system 10 in FIG. 1 can be represented as the node device 100 in FIG. 2. In an embodiment, the node devices 100A, 100B, and 100C may each be represented by the node device 100 in FIG. 2.

The node device 100 can comprise a processor and/or a programmable circuitry and one or more non-transitory computer readable storage mediums collectively including instructions. The instructions, when executed by the processor or programmable circuitry, may cause the processor or the programmable circuitry to operate as a plurality of operating sections. Thereby, the node device 100 may be represented as a storing section 110, a receiving section 120, a consenting section 130, an updating section 140, a calculating section 150, a providing section 160, a growing section 165, and a requesting section 170.

The storing section 110 stores a portion of the common data of the system 10. The storing section 110 may include a database 112 for storing the portion of the common data. In an embodiment, the database 112 may adopt a Key-Value Store for storing the portion of the common data. In another embodiment, the database 112 may adopt a Relational Database (or RDB) for storing the portion of the common data.

In the embodiment of FIG. 2, the database 112 of the node device 100A (which may be referred to as "112A", and similarly other sections * in the node device 100X may be referred to as *X) may store a first portion (e.g., Data 1 and Data 2) among three data portions of the common data.

The storing section 110 may also store hash values of the first portion. In an embodiment, the database 112A may store hash values of Data 1 and Data 2 (shown as D1 and D2). The storing section 110 may store a hash value of a second portion of the common data, wherein the second portion is different from the first portion. In an embodiment, the database 112A may store a hash value of Data 3 (shown as D3).

The storing section 110 may also store a plurality of blocks (shown as Block (1), Block (2), ..., Block (n)) of a blockchain. Each of the plurality of blocks may include transactions, a hash of a latest block, and hash values of the common data. In the embodiment, the n-th Block(n) of the blockchain may include a latest transaction(s), a hash value of an (n−1)-th block (shown as Hash[B(n−1)]), and a hash value of current common data (shown as Hash[D1, D2, D3]).

The storing section 110 may also store a variety of data used for operations of the node device 100. One or more other elements in the node device 100 (e.g., the receiving section 120, the consenting section 130, the updating section 140, the calculating section 150, the providing section 160, the growing section 165, and the requesting section 170, etc.) may communicate data directly or via the storing section 110, as necessary. The storing section 110 may comprise one or more storage units each comprising a volatile or non-volatile memory.

The receiving section 120 may receive a variety of data used for operations of the node device 100. In an embodiment, the receiving section 120 may receive a transaction from a non-validating device 200 or the other node device 100. In the embodiment, the receiving section 120 may receive a first transaction related to the first portion. In the embodiment, the receiving section 120A may receive the first transaction that requires an update of the first portion (e.g., Data 1 and/or Data 2).

The receiving section 120 may receive data from other node devices. In an embodiment, the receiving section 120A may receive a second portion (e.g., Data 3) of the common data from the node devices 100B and/or 100C. In an embodiment, the receiving section 120A may receive a hash value (e.g., D3) of the second portion (e.g., Data 3) from the node devices 100B and/or 100C.

The consenting section 130 may perform operations of consensus algorithms in cooperation with the other node devices. In an embodiment, the consenting section 130 may build a consensus on the first transaction or on the hash value of the first portion of the common data with the consenting section 130 of the other node devices 100 that store the first portion.

In an embodiment, the consenting section 130A may build the consensus on the first transaction for the first portion Data 2, with the consenting section(s) 130A of the other node device(s) 100A and the consenting section(s) 130B. In an embodiment, the consenting section 130A may build the consensus on the hash value of the first portion Data 1 with the consenting section(s) 130A of the other node device(s) 100A and the consenting section(s) 130C.

The updating section 140 updates the first portion of the common data in the database 112 based on the first transaction. In an embodiment, the updating section 140A may update the first portion Data 1 in the database 112A to reflect the first transaction in response to the consensus of the first transaction between the consenting section(s) 130A and the consenting section(s) 130C.

The calculating section 150 calculates a hash value of a variety of data used for operations of the node device 100. In an embodiment, the calculating section 150 may calculate a hash value of the first portion of the common data. In the embodiment, the calculating section 150A calculates the hash values D1 and D2 from the first portion Data 1 and Data 2 in the database 112A.

In an embodiment, the calculating section 150 calculates a hash value of the previous block of the blockchain in the storing section 110. In the embodiment, the calculating section 150A calculates the hash value Hash(B(n−1)) of an (n−1)-th block in the storing section 110A.

The providing section 160 provides the hash value of the first portion to one or more other node devices of the plurality of node devices. In an embodiment, the providing section 160A may provide the hash value D1 of the first portion Data 1 to the node device(s) 100B, which does not store the first portion Data 1.

The providing section 160 may provide the first portion one or more other node devices of the plurality of node devices in response to a request from the one or more other node devices. In an embodiment, the providing section 160A provides the first portion Data 1 to the node device(s) 100B in response to receiving a request from the node device(s) 100B.

The growing section 165 may grow the blockchain in the storing section 110. In an embodiment, the growing section 165 may generate a new block (e.g., Block(n)) to include one or more latest transactions that are not included in the previous block(s) (e.g., Block 1, . . . , Block(n−1)), a hash of the latest block (e.g., Hash(B(n−1))), and hash values of the entire common data (e.g., D1, D2, and D3).

The requesting section 170 can request at least a part of the second portion of the common data to one or more other node devices of the plurality of node devices. The requesting section 170 may request the part of the second portion in response to a read query. In an embodiment, the requesting section 170A may request one or more records in the second portion Data 3 to the node device(s) 100B and/or the node device(s) 100C.

Figure 3:
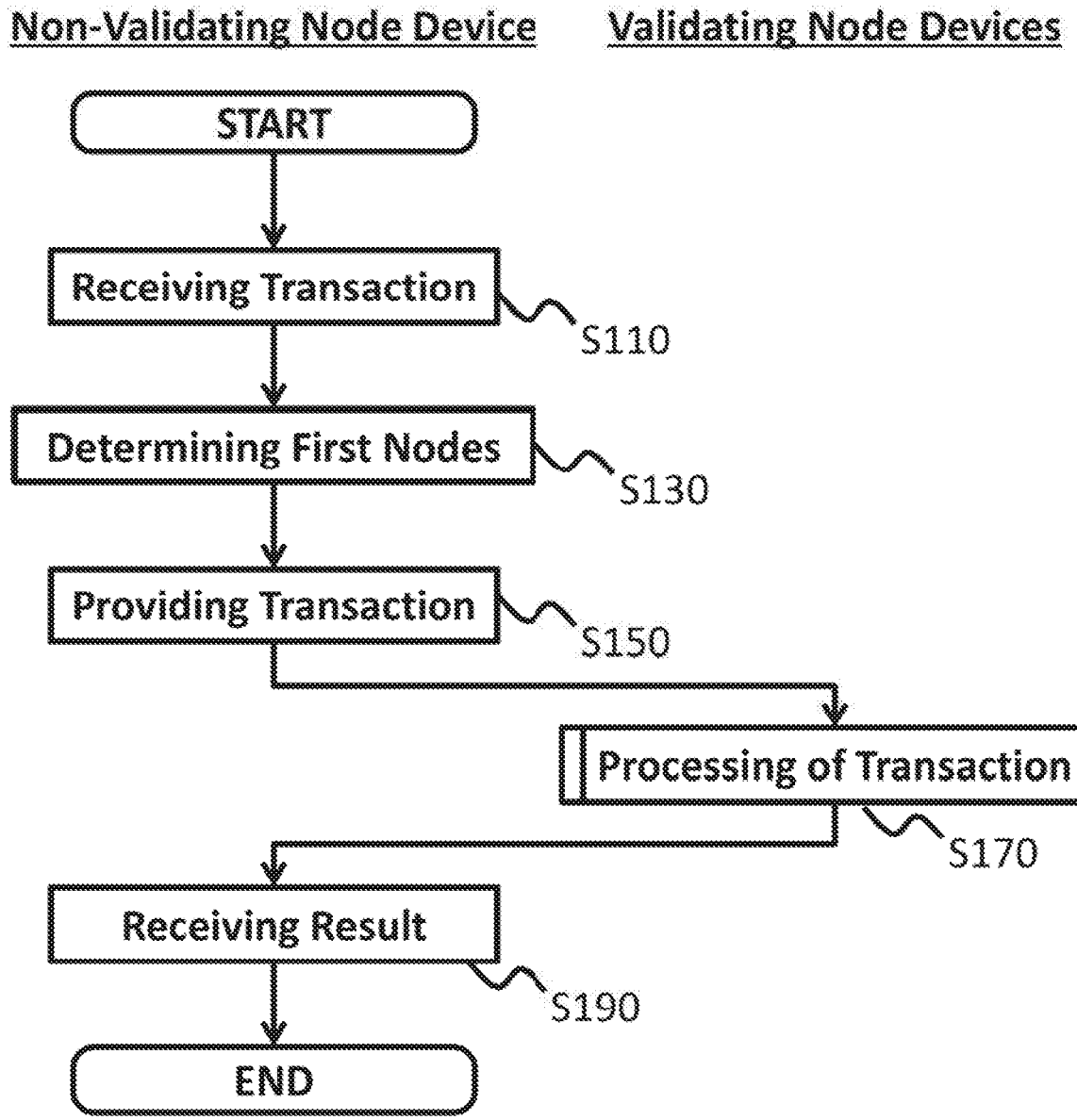
FIG. 3 shows a first operational flow according to an embodiment of the present invention.

FIG. 3 shows a first operational flow according to an embodiment of the present invention. The present embodiment describes an example in which a system, such as the system 10, performs the operations from S110 to S190, as shown in FIG. 3. The system may process a transaction by the operations of S110-S190.

At S110, a non-validating device, such as the non-validating device 200, receives a transaction from a user terminal. In an embodiment, an application of the user terminal may generate a first transaction based on a request of a user and transmit the first transaction to the non-validating device. Then, the non-validating device may receive the first transaction.

At S130, the non-validating device may determine first node devices, among the plurality of node devices, acting as validating peers. In an embodiment, the non-validating device may determine node devices that store a first portion of a common data that is related to the first transaction. In the embodiment of FIGS. 1-2 where the first portion is Data 2, the non-validating device 200 may determine the node devices 100A and 100B storing Data 2, as the first node devices.

In an embodiment, records of the common data are divided into a plurality of portions (e.g., Data 1, Data 2, and Data 3) by a predetermined rule. The non-validating device may identify which record(s) in the common data is to be updated by the first transaction, and identify to which portion the identified record is allocated, based on the predetermined rule. In an embodiment, the non-validating device may determine the identified portion as the first portion.

At S150, the non-validating device may provide the first transaction to at least one of the first node devices. In an embodiment, the non-validating device may provide the first transaction to a node device acting as a leader in Hyperledger among the first node devices.

In another embodiment, the non-validating device may provide the first transaction to all of the first node devices. In an embodiment relating to FIGS. 1-2, the non-validating device 200 may select one leader node device from the node devices 100A and the node devices 100B, and provide the first transaction relating to Data 2 to the leader node device.

At S170, the plurality of node devices (shown as "Validating Node Devices") may process the first transaction. In the embodiment of FIGS. 1-2, the node devices 100A, the node devices 100B, and the node devices 100C may process the first transaction. Details of S170 may be explained below in relation to FIG. 4.

At S190, the non-validating device may receive the result of the first transaction from the first node devices. The non-validating device may transmit the result to the user terminal.

Figure 4:
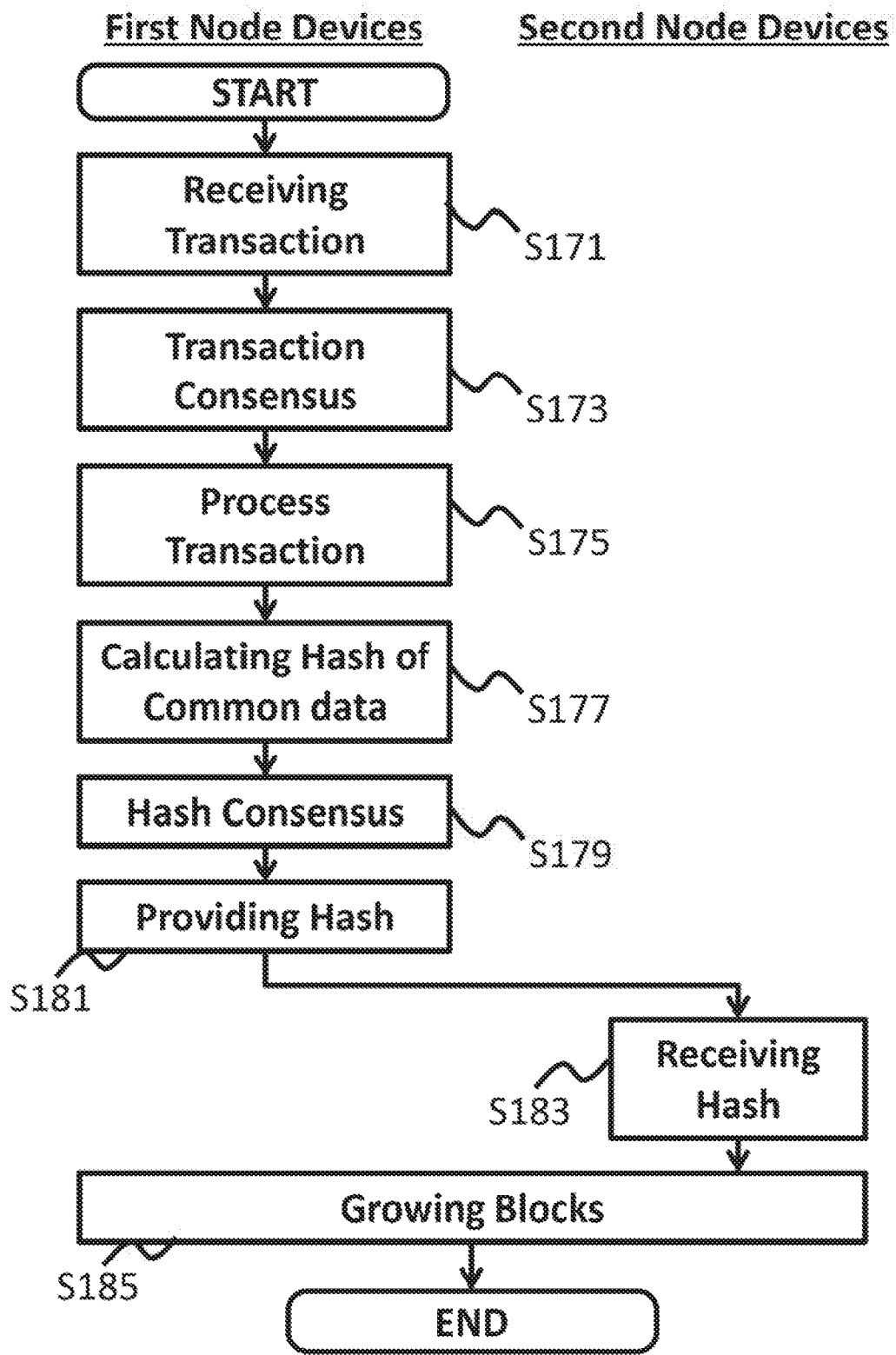
FIG. 4 shows a sub-flow of FIG. 3 according to an embodiment of the present invention.

FIG. 4 shows a sub-flow of S170 of FIG. 3 according to an embodiment of the present invention. The plurality of node devices, such as the node devices 100A, the node devices 100B, and the node devices 100C, may at least partially perform the operations from S171 to S185 as shown in FIG. 4 during the operation of S170 in FIG. 3.

At S171, the first node devices may receive the first transaction from the non-validating device. In an embodiment, a leader node device (e.g., the node device 100A) among the first node devices may first receive the first transaction. In the embodiment of FIGS. 1-2, the receiving section (e.g., the receiving section 120A) of the leader node device may receive the first transaction relating to Data 2 from the non-validating device 200.

At S173, the first node devices may perform a consensus algorithm on the first transaction. The first node devices may perform one or more consensus algorithms known in the field of Blockchain technologies or other fields.

In an embodiment, the leader node device may broadcast the first transaction to the rest of the first node devices. For example, the consenting section 130A of the leader node device (e.g., one node device 100A) may broadcast the first transaction relating to Data 2 to the consenting sections 130A of the node devices 100A except the leader node device 100A and the consenting sections 130B of the node devices 100B. The first node devices, except the leader node device, may be referred to as non-leader node devices.

In an embodiment, each of the non-leader node devices may confirm whether the first transaction is correctly received by the leader node device (e.g., the transaction is not manipulated by the leader node device), and broadcast a result of the confirmation to the first node devices except itself. Each of the first node devices may confirm whether it received a result "the first transaction is correctly received" from a predetermined number or more of the first node devices, and may broadcast a result of this confirmation. In an embodiment, the predetermined number may be ⅔ of the number of the first nodes participating in the consensus process.

Then, each of the first node devices may confirm whether it received a result "the result 'the first transaction is correctly received' is received by a predetermined number or more of the first node devices." Each of the first node devices may proceed with an operation of S175 for the first transaction if this confirmation is positive, and may abort the first transaction if this confirmation is negative.

At S175, the first node devices may process the first transaction. In an embodiment, the first node devices may update the first portion of the common data. In the embodiment of FIGS. 1-2, the updating sections 140A and 140B of the node devices 100A and 100B may each update the first portion Data 2 to Data 2' in the respective database 112A and 112B. In the embodiment, the updating sections 140A and 140B may each update one or more records in the first portion to reflect the first transaction.

At S177, the first node devices may calculate a hash value of the first portion. In an embodiment, the calculating sections 150A and 150B of the node devices 100A and 100B may each calculate a hash value of the first portion Data 2' to obtain a hash value D2'.

At S179, the first node devices may perform a consensus algorithm on the hash value of the first portion. The first node devices may perform one or more consensus algorithms known in the field of Blockchain technologies or other fields.

In an embodiment, each of the first node devices may broadcast the hash value of the first portion (e.g., D2') to the other first node devices. Each of the first node devices may confirm whether it has received a hash value that is the same as its calculated hash value from a predetermined number or more of the first node devices, and may broadcast a result of this confirmation.

Then, each of the first node devices may confirm whether it received a result "it has received a hash value that is the same with its calculating hash value from a predetermined number or more of the first node devices" is received by a predetermined number or more of the first node devices.

Each of the first node devices may update a hash value of the first portion D2 to the consented hash value D2' and may proceed with an operation of S181 if this confirmation is positive, and may abort the first transaction by restoring the first portion in the database if this confirmation is negative.

At S181, the first node devices may provide the hash value of the first portion to the plurality of node devices that are nodes of the first node devices (which may be referred to as "second node devices"). In the embodiment of FIGS. 1-2, one or more of the providing sections 160A and the providing sections 160B may distribute the hash value D2' to the node devices 100C.

In an embodiment, the first node devices may also provide the first transaction to the second node devices. In an alternative embodiment, the non-validating device may provide the first transaction not only to the first node devices but also the second node devices at S150.

At S183, the second node devices may receive the hash value of the first portion. In the embodiment of FIGS. 1-2, the receiving sections 120C of the node devices 100C may receive the hash value D2' from the node device(s) 100A and 100B. Thereby, the second node devices 100C may receive a hash value of the first portion Data 2 (which is a second portion for the second node devices) of the common data, in response to an update of the first portion of the common data.

At S185, the first node devices and the second node devices may grow a blockchain in the respective storing section based on the first transaction, the hash values of the entire common data, and the latest block in the block chain. In an embodiment, the growing sections 165A, 165B, and 165C may each generate a new Block(n+1) based on hash values (D1, D2', D3), the latest Block(n), and the first transaction.

The first node devices and the second node devices may store the new block. In an embodiment, the storing sections 110A, 110B, and 110C may each store the new block. Thereby the storing sections 110A, 110B, and 110C may each store a plurality of blocks, each of which comprises the hash value of the first portion (e.g., D1 and D2' for the node device 100A, and D1 and D3 for the node device 100C) and the hash value of the second portion (e.g., D3 for the node device 100A, and D2' for the node device 100C).

The first node devices and the second node devices may further transmit a result of the first transaction and/or the new block to the non-validating device.

As described above, at least some of the node devices in Blockchain system may store only a portion of the entire common data, thereby reducing a total storage usage in the system. In addition, since such node devices may not need to calculate a hash value of the entire common data, processing time and computation resources for growing the blockchain may also be reduced.

FIGS. 5-8 show transitions of the data state in the system during processing of a transaction, according to an embodiment of the present invention.

Figure 5:
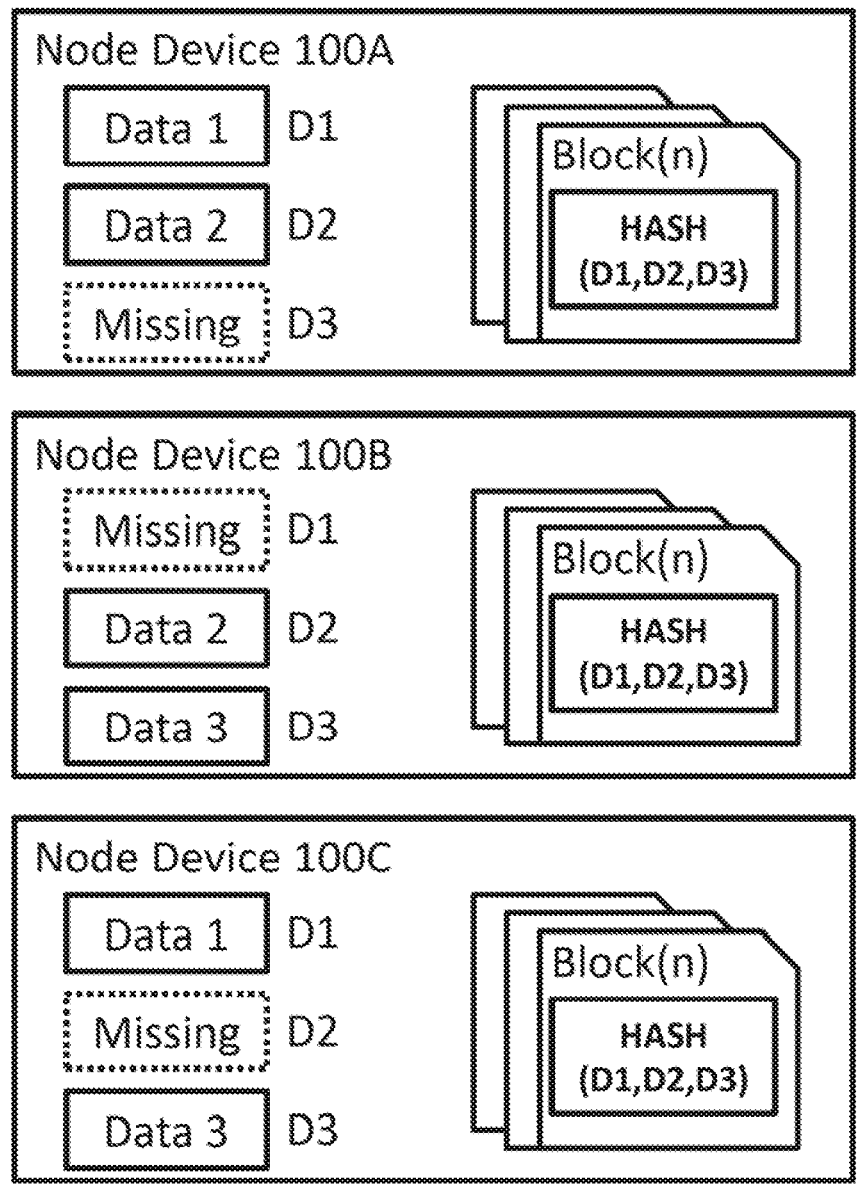
FIG. 5 shows a state of node devices before processing a first transaction, according to an embodiment of the present invention.

FIG. 5 shows a state of a node device 100A, a node device 100B, and a node device 100C before processing a first transaction, according to an embodiment of the present invention. In the embodiment, the node device 100A stores a portion of a common data (shown as Data 1 and Data 2), hash values of the entire common data (shown as D1, D2, and D3), and n blocks (shown as . . . Block (n)).

The node device 100B stores a portion of a common data (shown as Data 2 and Data 3), hash values of the entire common data (shown as D1, D2, and D3), and n blocks (shown as . . . Block (n)). The node device 100C stores a portion of a common data (shown as Data 1 and Data 3), hash values of the entire common data (shown as D1, D2, and D3), and n blocks (shown as . . . Block (n)). The n-th Block(n) of the node devices 100A, 100B, and 100C comprises at least hash values of the entire common data (e.g., D1, D2, and D3).

Figure 6:
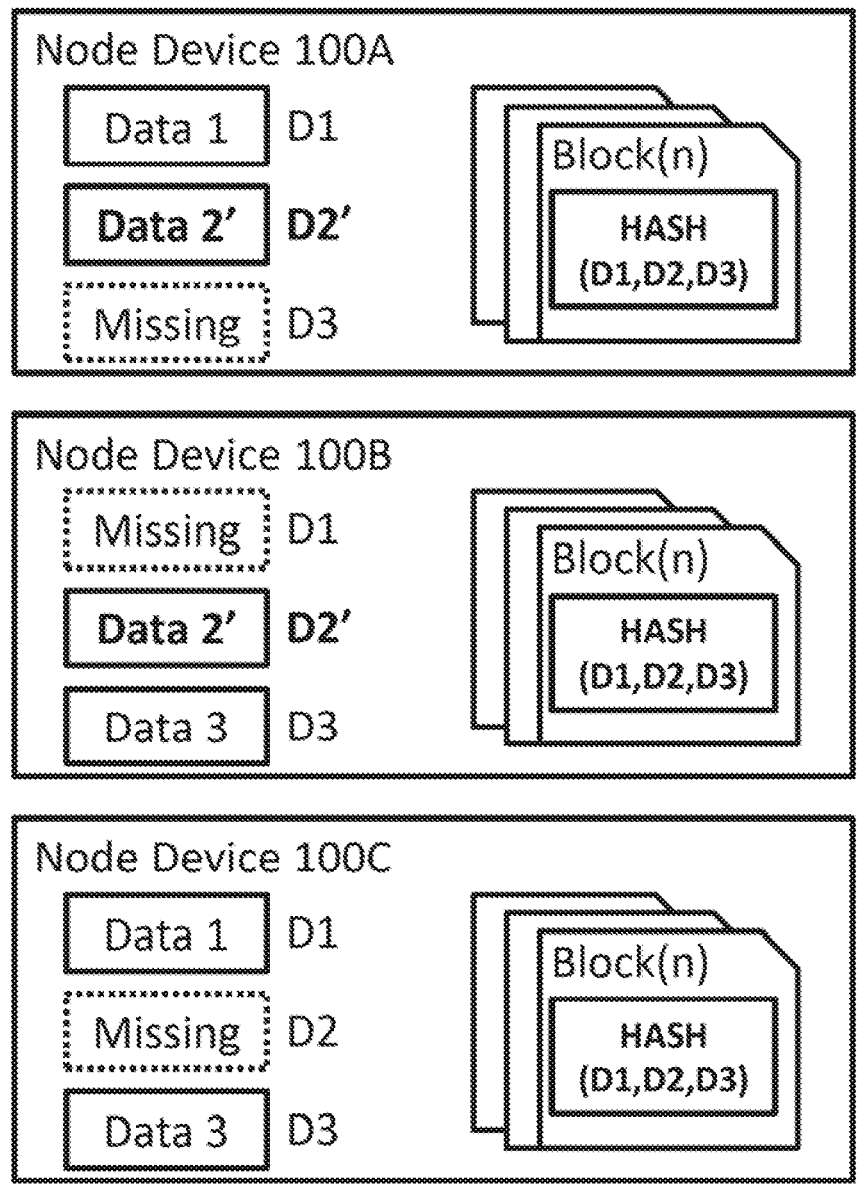
FIG. 6 shows a state of node devices after processing the first transaction, according to an embodiment of the present invention.

FIG. 6 shows a state of a node device 100A, a node device 100B, and a node device 100C after processing the first transaction (e.g., after the operation of S179), according to an embodiment of the present invention. The first node devices (e.g., the node devices 100A and the node devices 100B) update the first portion Data 2 to Data 2' to reflect the first transaction. The node device 100A and the node device 100B also calculate a hash value D2' from Data 2', and update the hash value D2 to D2'.

Figure 7:
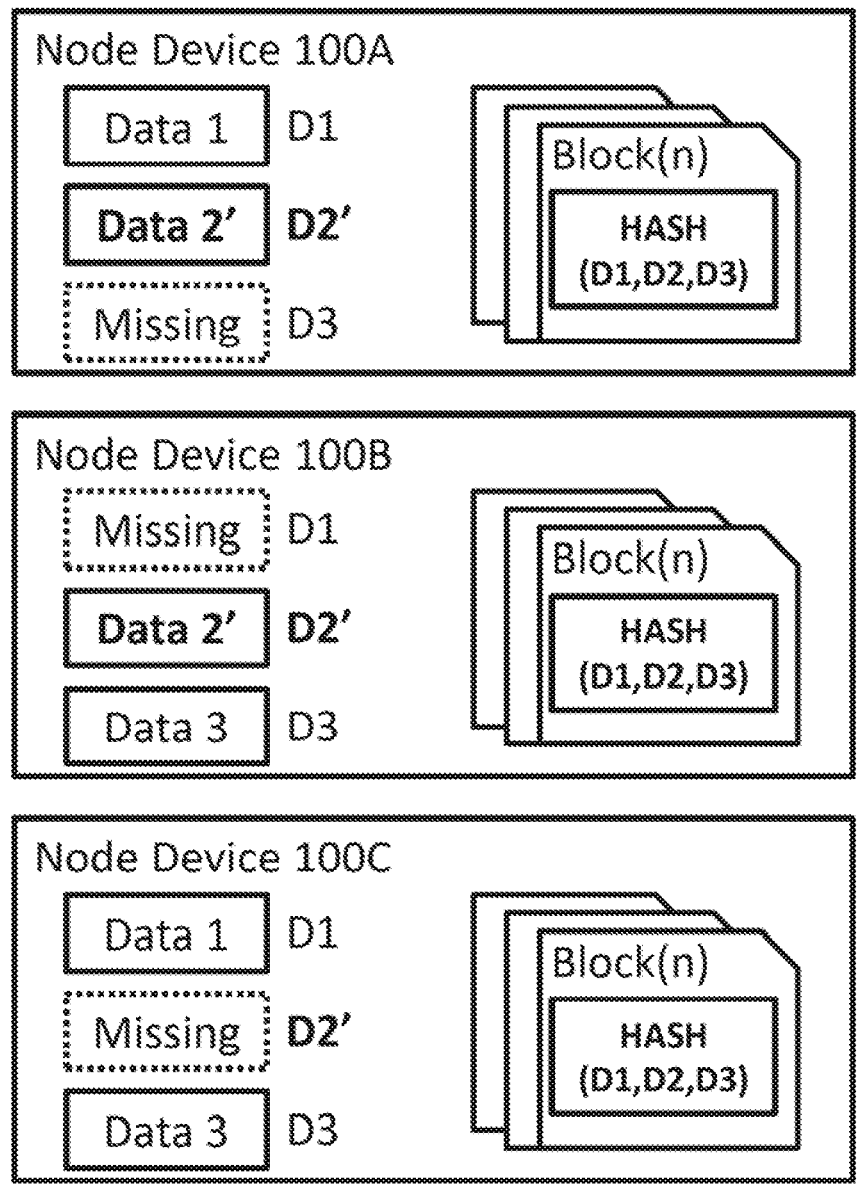
FIG. 7 shows a state of node devices after providing the hash value, according to an embodiment of the present invention.

FIG. 7 shows a state of a node device 100A, a node device 100B, and a node device 100C after providing the hash value (e.g., after the operation of S183), according to an embodiment of the present invention. The first node devices, such as the node device 100A and/or 100B, provide the hash value D2' to the second node devices such as the node device 100C. The node device 100C updates the previous hash value D2 to the hash value D2'.

Figure 8:
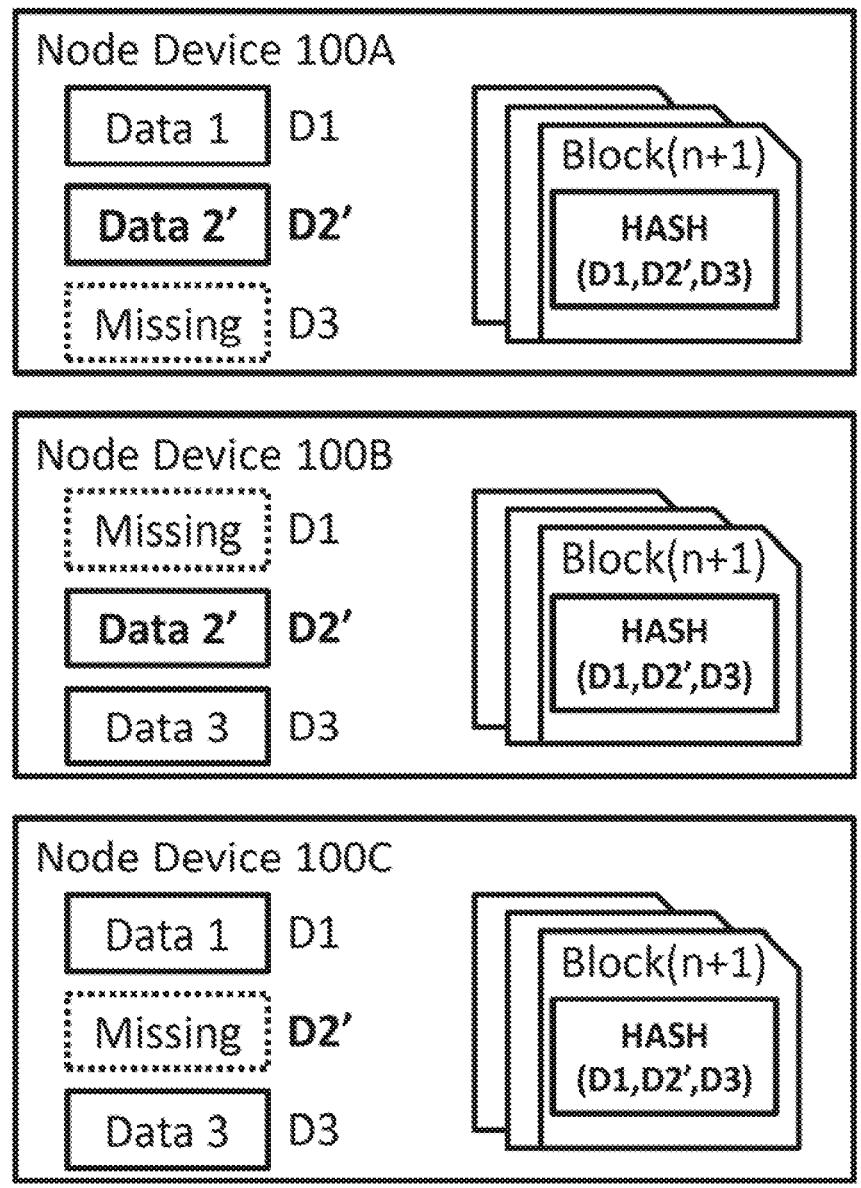
FIG. 8 shows a state of node devices after growing a blockchain, according to an embodiment of the present invention.

FIG. 8 shows a state of a node device 100A, a node device 100B, and a node device 100C after growing a blockchain (e.g., after the operation of S185), according to an embodiment of the present invention. All node devices 100A, 100B, and 100C generate a new Block(n+1), and add the new Block (n+1) to the existing blockchain. Block(n+1) includes all hash values (e.g., D1, D2', and D3) of the updated common data (e.g., Data 1, Data 2', and Data 3).

In the embodiment described above, the node devices may grow the blockchain in response to processing every transaction. In other embodiments, the node devices may grow the blockchain in response to processing a group of transactions. In these embodiments, the node devices may perform a consensus process for hash of S179 for every group of transactions or for every transaction, before growing blocks.

In the former case, every node device may broadcast hash value(s) of its updating portion(s) of the common data to all other node devices at a time, thereby reducing the number of communications between the node devices. In such a case, while node devices that do not have a portion of the common data may participate in the consensus process of the hash value of the portion, these node devices may declare that they do not have the portion.

In the embodiment described above, the node devices may process a transaction that is related to one portion (e.g., Data 1) of the common data. In other embodiments, the node devices may process a transaction that is related to two or more portions (e.g., Data 1 and Data 3) of the common data.

In some cases, the node device may not store all of the two or more portions of the common data in its database when processing the transaction. For example, the node device 100A may receive the transaction relating to Data 1 and Data 3, but only store Data 1.

In such cases, the node device may receive portion(s) that it does not store, from other node devices. For example, the updating section 140A of the node device 100A may request Data 3 to the node device 100B and/or 100C, receive Data 3 from the node device 100B and/or 100C, and process the first transaction using Data 3 at the operation of S175.

In this embodiment, the node device 100A may update Data 1 and Data 3 to Data 1' and Data 3', and calculate their hash values D1' and D3'. The node device 100A may store Data 1', D1' and D3' in its database 112A.

Figure 9:
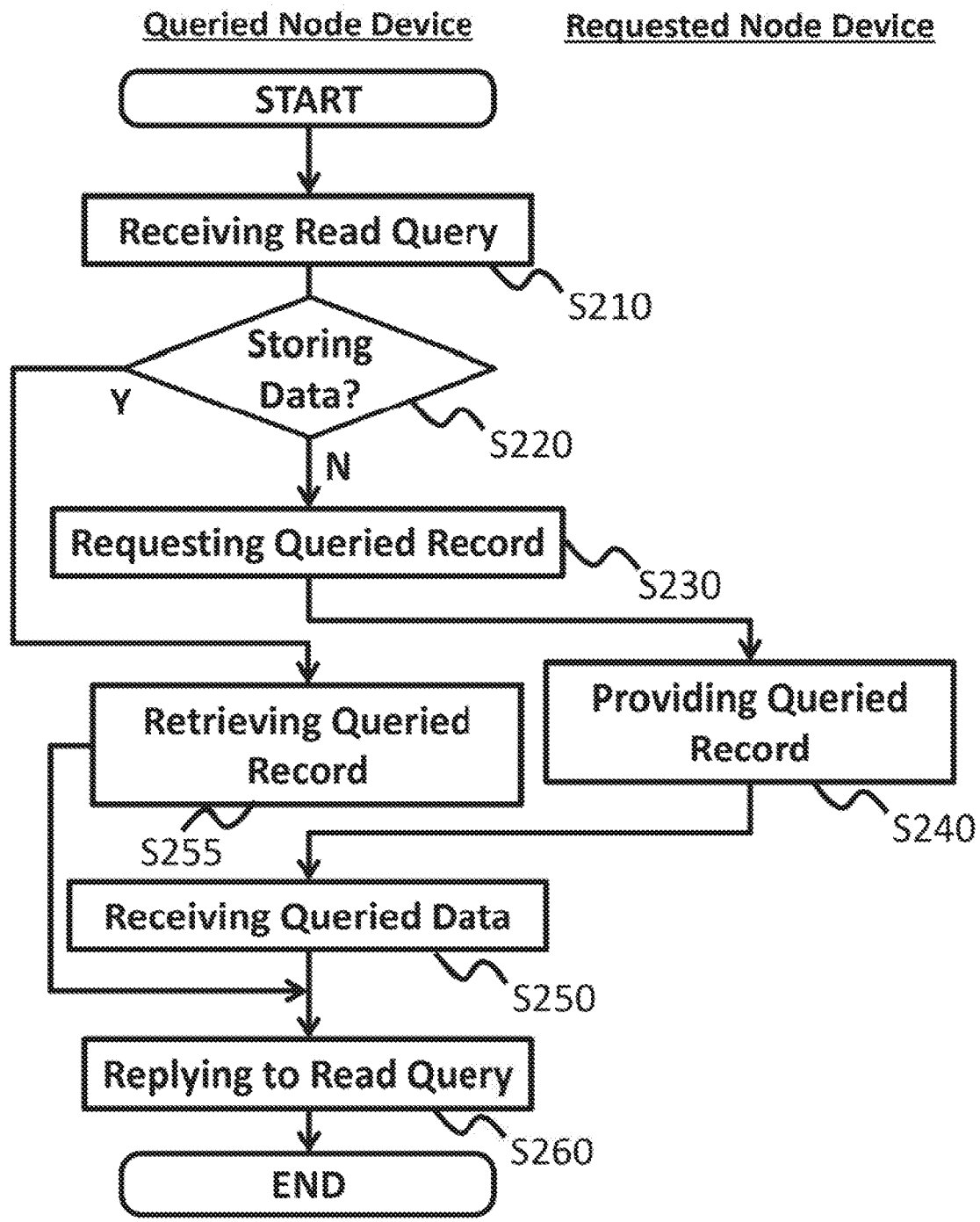
FIG. 9 shows a second operational flow according to an embodiment of the present invention.

FIG. 9 shows a second operational flow according to an embodiment of the present invention. The present embodiment describes an example in which a system, such as the system 10, performs the operations from S210 to S260, as shown in FIG. 9. The system may process a read query by the operations of S210-S260.

At S210, a receiving section, such as the receiving section 120, of a node device, such as the node device 100, may receive a read query directly or indirectly from the user terminal. In an embodiment, the read query may be a request to read one or more records in the common data. The node device that has received the read query may be referred to as a "queried node device" and the record that is requested by the read query may be referred to as a "queried record."

At S220, a requesting section, such as the requesting section 170, of the queried node device 100 may determine whether it stores the queried record in its database, such as the database 112. In the embodiment of FIG. 1, the requesting section 170A of the node device 100A may determine that it stores the queried data in the database 112A if Data 1 or Data 2 includes the queried record.

The requesting section 170A may determine that it does not store the queried data in the database 112A if neither Data 1 nor Data 2 includes the queried record. If the decision is positive, the requesting section may proceed with an operation of S255, and if negative, the requesting section may proceed with an operation of S230.

At S230, the requesting section of the queried node device may request data of the queried record to other node devices. In an embodiment, the requesting section may identify at least one node device that stores the queried record according to the predetermined rule of allocation of the common data.

In the embodiment, the requesting section may transmit the request of the queried record to the identified node device (which may be referred to as a "requested node device"). In the embodiment of FIG. 1, the requesting section 170A may transmit the request of the queried data included in Data 3 to the node device 100B and/or the node device 100C that stores Data 3.

At S240, the requested node device(s) may retrieve the queried record from its database and provide queried record to the queried node device. In an embodiment, the providing section 160C of the node device 100C may retrieve the queried record from Data 3 in the database 112C, and provide the queried record to the node device 100A. In an embodiment, the providing section 160C may provide the first portion Data 3 itself to the node device 100A.

At S250, the receiving section of the queried node device may receive data of the queried record that is retrieved by the requested node device(s). In an embodiment, the receiving section 120A of the node device 100A may receive the queried record relating to Data 3 from the providing section 160C of the node device 100C.

At S255, the requesting section may retrieve the queried record from its database. In the embodiment of FIG. 1, when the queried record is included in Data 1, the requesting section 170A of the node device 100A may retrieve the queried record from Data 1 in the database 112A.

At S260, the requesting section may reply to the read query received at S210. In an embodiment, the requesting section may transmit data of the queried record to the user terminal.

In the embodiments described above, the plurality of node devices may all store a portion of the common data. In another embodiment, at least one node device of the plurality of node devices in the system may store the common data entirely (e.g., Data 1, Data 2 and Data 3 in FIG. 1). Such node device may process a read query without requesting data to the other node devices.

Figure 10:
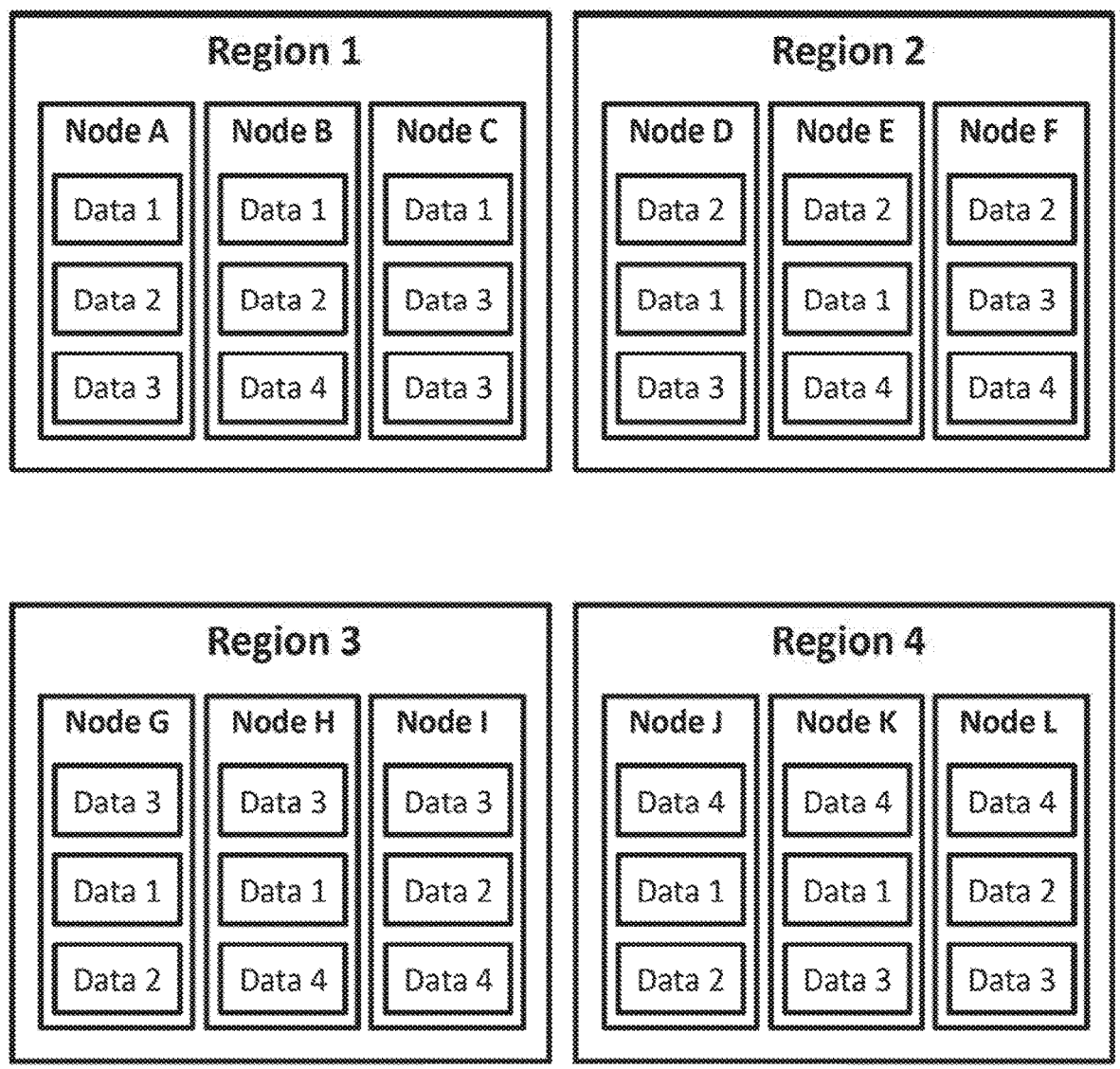
FIG. 10 shows an example of the system according to an embodiment of the present invention.

FIG. 10 shows an example of the system according to an embodiment of the present invention. In the embodiments described in relation to FIG. 10, each node in a system stores local data. According to FIG. 10, the system is divided into four regions (shown as Region 1, Region 2, Region 3, and Region 4).

In an embodiment, the four regions may relate to geographical regions. In the embodiment, Region 1 may correspond to North and South America, Region 2 may correspond to Europe, Region 3 may correspond to Asia, Region 4 may correspond to other regions in the world, in an example.

In an alternative embodiment, the four regions may relate to capital groups divided according to capital ties, topological groups divided according to topological relationship in network, user groups formed such that users frequently transacting with each other are grouped into one group based on a transaction history, etc.

According to FIG. 10, the system includes twelve (12) node devices (shown as Node A, Node B, Node C, Node D, Node E, Node F, Node G, Node H, Node I, Node J, Node K, and Node L). Region 1 includes Nodes A-C, Region 2 includes Nodes D-F, Region 3 includes Nodes G-I, and Region 4 includes Nodes J-L.

According to FIG. 10, common data are divided into four (4) portions (shown as Data 1, Data 2, Data 3, and Data 4). In the embodiment of FIG. 10, the common data are divided such that data i completely or mainly include records coming from Region i (e.g., records of companies or persons existing in Region i).

In the embodiment, the node devices in Region i all store Data i. For example, Nodes A-C in Region 1 all store Data 1, Nodes D-F in Region 2 all store Data 2, Nodes G-I in Region 3 all store Data 3, and Nodes J-L in Region 4 all store Data 4.

While local node devices may most frequently receive a read query relating to local data, it can respond to the local read query without requesting data to the other node devices, according to the embodiment of FIG. 10.

The plurality of node devices include the at least one new node device. For example, the system may introduce at least one new node device in Blockchain. The at least one new node device may store a third portion of the common data in response to joining the system.

The third portion may be the same as the first portion of the common data of existing node device(s). For example, a node device 100X newly joining the system 10 in FIG. 1 may copy a role of the node device A, and store Data 1 and Data 2 in the database 112X.

In an embodiment, the new node device may store portions of the common data smaller than other existing node devices. For example, a node device 100X newly joining the system 10 in FIG. 1 may store only Data 1.

Figure 11:
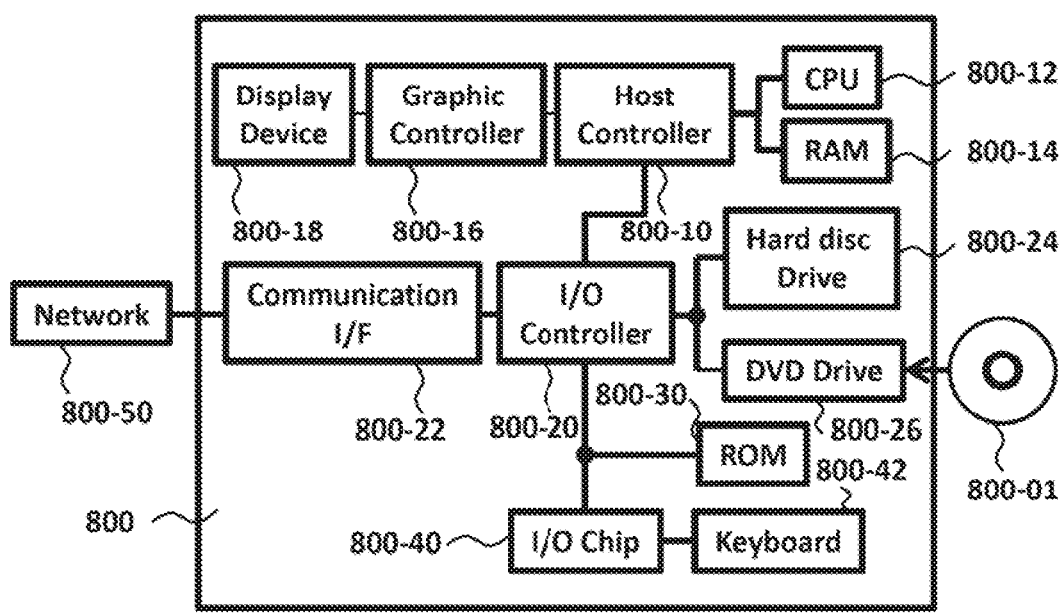
FIG. 11 shows an exemplary hardware configuration of a computer that functions as a system, according to an embodiment of the present invention.

FIG. 11 shows an exemplary hardware configuration of a computer configured for cloud service utilization, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14.

In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable a learning apparatus learning a model corresponding to time-series input data to have higher expressive ability and learning ability and to perform the learning operation more simply.

What is claimed is:

1. A method to reduce the storage used in distributed databases, comprising:
   dividing common data into two or more portions according to one or more predetermined rules;
   storing a first portion of the common data in a database of at least one node device from a plurality of node devices, the first portion being a subset of the common data and being less than all of the common data; and receiving a hash value of a second portion of the common data that is different from the first portion, in response to an update of the second portion of the common data by the at least one node device, wherein each of the plurality of node devices stores at least a respective portion of the common data in a respective database.

2. The method of claim 1, wherein the plurality of node devices collectively store the common data entirely.

3. The method of claim 2, further comprising:
receiving a first transaction related to the first portion, by the at least one node device; and
updating the first portion of the common data based on the first transaction, by the at least one node device.

4. The method of claim 3, further comprising:
calculating a hash value of the first portion, by the at least one node device; and
providing the hash value of the first portion to one or more other node devices from the plurality of node devices, by the at least one node device.

5. The method of claim 4, further comprising storing a plurality of block, each block comprising the hash value of the first portion and the hash value of the second portion, by the at least one node device.

6. The method of claim 1, further comprising requesting at least a part of the second portion of the common data to one or more other node devices from the plurality of node devices, by the at least one node device.

7. The method of claim 2, wherein another node device from the plurality of node devices stores the common data entirely.

8. The method of claim 4, further comprising:
generating a new block; and
storing the new block with the plurality of blocks.

9. The method of claim 6, wherein requesting further comprises requesting at least a part of the second portion of the common data to one or more other node devices from the plurality of node devices in response to a read request.

10. The method of claim 4, wherein providing further comprises providing the hash value of the first portion to one or more other node devices in response to a request from the one or more other node devices.

11. The method of claim 8, wherein generating the new block is in response to updating the first portion of the common data based on the first transaction.

12. A method to reduce the storage used in blockchain, comprising:
dividing common data into two or more portions according to one or more predetermined rules;
storing a first portion of the common data in a database of at least one node device from a plurality of node devices, the first portion being a subset of the common data and being less than all of the common data; and
receiving a hash value of a second portion of the common data that is different from the first portion and adding the hash value to a block chain on the at least one node, in response to an update of the second portion of the common data by the at least one node device, wherein each of the plurality of node devices stores at least a respective portion of the common data in a respective database.

13. The method of claim 12, wherein the plurality of node devices collectively store the common data entirely.

14. The method of claim 13, further comprising:
receiving a first transaction related to the first portion, by the at least one node device; and
updating the first portion of the common data based on the first transaction, by the at least one node device.

15. The method of claim 14, further comprising:
calculating a hash value of the first portion, by the at least one node device; and
providing the hash value of the first portion to one or more other node devices from the plurality of node devices, by the at least one node device.

16. The method of claim 15, further comprising storing a plurality of block, each block comprising the hash value of the first portion and the hash value of the second portion, by the at least one node device.

17. The method of claim 12, further comprising requesting at least a part of the second portion of the common data to one or more other node devices from the plurality of node devices, by the at least one node device.

18. The method of claim 13, wherein another node device from the plurality of node devices stores the common data entirely.

19. The method of claim 15, further comprising:
generating a new block; and
storing the new block with the plurality of blocks.

20. The method of claim 15, wherein providing further comprises providing the hash value of the first portion to one or more other node devices in response to a request from the one or more other node devices.

* * * * *